US010769160B2

(12) United States Patent
Reilly (10) Patent No.: US 10,769,160 B2
(45) Date of Patent: Sep. 8, 2020

(54) EFFICIENT STORAGE AND QUERYING OF TIME SERIES METRICS (71) Applicant: AirMagnet, Inc., Santa Clara, CA (US)

(72) Inventor: Peter Reilly, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 492 days.

(21) Appl. No.: 15/655,608

(22) Filed: Jul. 20, 2017

(65) Prior Publication Data
US 2019/0026349 A1 Jan. 24, 2019

(51) Int. Cl.
G06F 7/00 (2006.01)
G06F 16/2458 (2019.01)
(Continued)

(52) U.S. Cl.
CPC ...... G06F 16/2477 (2019.01); G06F 11/3006 (2013.01); G06F 11/3419 (2013.01); G06F 16/2219 (2019.01); G06F 16/2237 (2019.01); G06F 16/2264 (2019.01); G06F 16/2282 (2019.01); H04L 43/067 (2013.01); H04L 43/08 (2013.01); H04L 41/5009 (2013.01); H04L 43/045 (2013.01)

(58) Field of Classification Search
CPC ............. G06F 16/2477; G06F 16/2237; G06F 16/2282; G06F 16/2219; G06F 16/2264; G06F 11/3006; G06F 11/3419
See application file for complete search history.

(56) References Cited

U.S. PATENT DOCUMENTS 5,742,810 A 4/1998 Ng et al.
6,662,164 B1* 12/2003 Koppelman ..... G06Q 10/06398
705/14.13
(Continued)

FOREIGN PATENT DOCUMENTS

EP 1716668 A1 11/2006
WO WO-2016191639 A1 12/2016

OTHER PUBLICATIONS

Extended European Search Report for European Patent Application No. 18184667.6, dated Nov. 16, 2018.
(Continued)

Primary Examiner — Azam M Cheema
(74) Attorney, Agent, or Firm — Locke Lord LLP; Scott D. Wofsy; Christopher J. Capelli (57) ABSTRACT A method for processing time series measurement data is provided. Data including a plurality of network performance metrics is received over a plurality of time periods. The received data is written to a plurality of measure data structures. The measure data structures are stored to a two dimensional array having a first dimension and a second dimension. The first dimension represents time and the second dimension represents a plurality of network entities. Elements of the two-dimensional array are compressed into BLOBs. Each one of the BLOBS is associated with a time period and a measure type associated with the data stored within a corresponding BLOB. The BLOBS are stored in a first table and second table. The first table is indexed by a combination of a network entity and a time period. The second table is indexed by a combination of a network performance metric and a network entity.

13 Claims, 5 Drawing Sheets (51) Int. Cl.
*G06F 11/30* (2006.01)
*G06F 11/34* (2006.01)
*H04L 12/26* (2006.01)
*G06F 16/22* (2019.01)
*H04L 12/24* (2006.01)

(56) References Cited

U.S. PATENT DOCUMENTS 9,672,246 B1* 6/2017 Volk ................... G06F 16/245
2016/0266956 A1 9/2016 Supplisson et al.

OTHER PUBLICATIONS

McGrath M. Garrett, et al: "Intercloud Networks Performance Analysis", 2015 IEEE International Conference on Cloud Engineering, IEEE, Mar. 9, 2015 (Mar. 9, 2015), pp. 487-492, XP032767789, DOI: 10.1109/IC2E.2015.85; [retrieved on Apr. 22, 2015]; chapters 4, 5.

* cited by examiner

EFFICIENT STORAGE AND QUERYING OF TIME SERIES METRICS

FIELD OF THE INVENTION

Embodiments of the present invention relate generally to data processing technology, and specifically to efficient storage and querying of time series metrics.

BACKGROUND OF THE INVENTION

Management of computer networks and network elements has become increasingly more complex over the years just as the elements and networks have increased in complexity. It is not sufficient to state that a network element or link between elements is "up" as opposed to "down". The performance of each network element and link between elements needs to be assessed in order to provide a complete view of the network. In order to assess performance, key performance indicators (KPIs) are used.

KPIs can include items such as "equipment temperature" to "traffic" and "dropped calls". In wireless networks, it is very common for a single element to offer several thousand such KPIs. As many different network elements can constitute the complete network, the total domain of available KPIs can very quickly reach tens of thousands to hundreds of thousands KPIs, each collected per network element and for each time interval (for example, every 5 to 15 minutes).

Network performance management applications collect all these KPIs for each monitored network element on a periodical basis (for example, every hour or every 15 minutes). This collection can very quickly lead to over a billion KPIs to monitor, on a daily basis. The multiplication of KPIs can therefore mean that a very large computer will be needed in order to collect, store, manage and report on this amount of data. Furthermore, in composite application management, a central system often collects information from several, disparate and heterogeneous sources, processes this combined information as a whole, and generates alarms when faults are detected.

It is desirable to have data storage systems that are well equipped to efficiently store and retrieve large amounts of data.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for processing time series measurement data is provided. Time series measurement data including a plurality of network performance metrics is received over a plurality of time periods. Each network performance metric measures performance of a network entity. The received time series measurement data is written to a plurality of measure data structures that include the plurality of network performance metrics. Each one of the plurality of measure data structures stores time series measurement data corresponding to one network entity. Each one of the plurality of measure data structures includes a header indicating a type and a time period associated with the time series measurement data stored within a corresponding measure data structure. The plurality of measure data structures is stored to a data structure configured as a two dimensional array having a first dimension and a second dimension. The first dimension represents time and the second dimension represents a plurality of network entities. Elements of the two-dimensional array are compressed into a plurality of Binary Large Objects (BLOBs). Each one of the plurality of BLOBS is associated with a time period and a measure type associated with the time series measurement data stored within a corresponding BLOB. The plurality of BLOBS is stored in a first table and second table. The first table is indexed by a combination of a network entity and a time period. The second table is indexed by a combination of a network performance metric and a network entity.

In another aspect, a method for retrieving time series measurement data is provided. One or more query parameters are received from a user. The query parameters include at least network performance metrics of interest, a time period of interest and network entities of interest. Elements are retrieved from a second table based on the received query parameters. The second table stores a plurality of BLOBS. The second table is indexed by a combination of a network performance metric and a network entity. The retrieved elements are sorted and one or more elements corresponding to the network entities of interest are extracted. Elements are retrieved from a first table based on the received query parameters. The first table stores the plurality of BLOBS. The first table is indexed by a combination of a network entity and a time period.

BRIEF DESCRIPTION OF THE DRAWINGS

The accompanying appendices and/or drawings illustrate various, non limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Embodiments of the present disclosure provide a method, system and computer program product for processing performance measurement data. For example, in some embodiments, a method comprises: receiving time series measurement data about a plurality of network performance metrics over a plurality of time periods; writing the received time series measurement data to a plurality of measure data structures including the plurality of network performance metrics; storing the plurality of measure data structures to a data structure configured as a two dimensional array; compressing the elements of the two-dimensional array into a plurality of BLOBs and storing each of the plurality of BLOBs in a first table and second table. The first table is indexed by a combination of a network entity and a time period and the second table is indexed by a combination of a network performance metric and a network entity. This method provides a way to shorten a content retrieval time from the time series measurement data storage system. The embodiments minimize hardware footprint and provide efficient storage and retrieval process.

Advantageously, performance metrics are particularly useful when fault tracking is an objective. In some embodiment, various metrics may be identified within an identification period starting before and ending after the fault occurs.

Metrics can be related to other metrics in different ways and related metrics include first, second and further levels of relationship. Some relationships are considered critical to fault finding and others are not critical. Relationships can be either explicit or implicit. For example a complex metric (often called KPI or KQI=Key Quality Indicator) may comprise several metrics. For example, one KPI is utilization=traffic/capacity. In this case, if an alarm is raised on the utilization, the user will be interested in drilling down to the traffic and capacity metrics. Similarly, if an alarm is raised on the traffic, the user will be interested in the utilization and capacity metrics. The embodiments ensure that related metrics are therefore stored and retrieved together. Other relationships could be specified in some metadata or extracted from another system, for example for KQIs: a service level metric could be associated to a "% dropped calls" metric. Additionally, metrics could be implicitly related and the relationships learnt by an algorithm, such as a correlation or causation algorithm.

The term fault is used in a broad sense to mean an event indicating a failure of something in a system. For instance, faults can be extended to any of: events or metrics for events in general; configuration changes; availability and faults; service level observations; detected behavioral anomalies, that is, a network entity (resource) not behaving in a similar way to the way it used to. A particular case of interest is the case of sentinel metrics which might reflect a condition worth of investigation when they meet certain conditions. Similarly, the term performance metrics is used in the claims to cover events such as KPIs, KQIs and any other performance or useful monitoring data.

Figure 1:
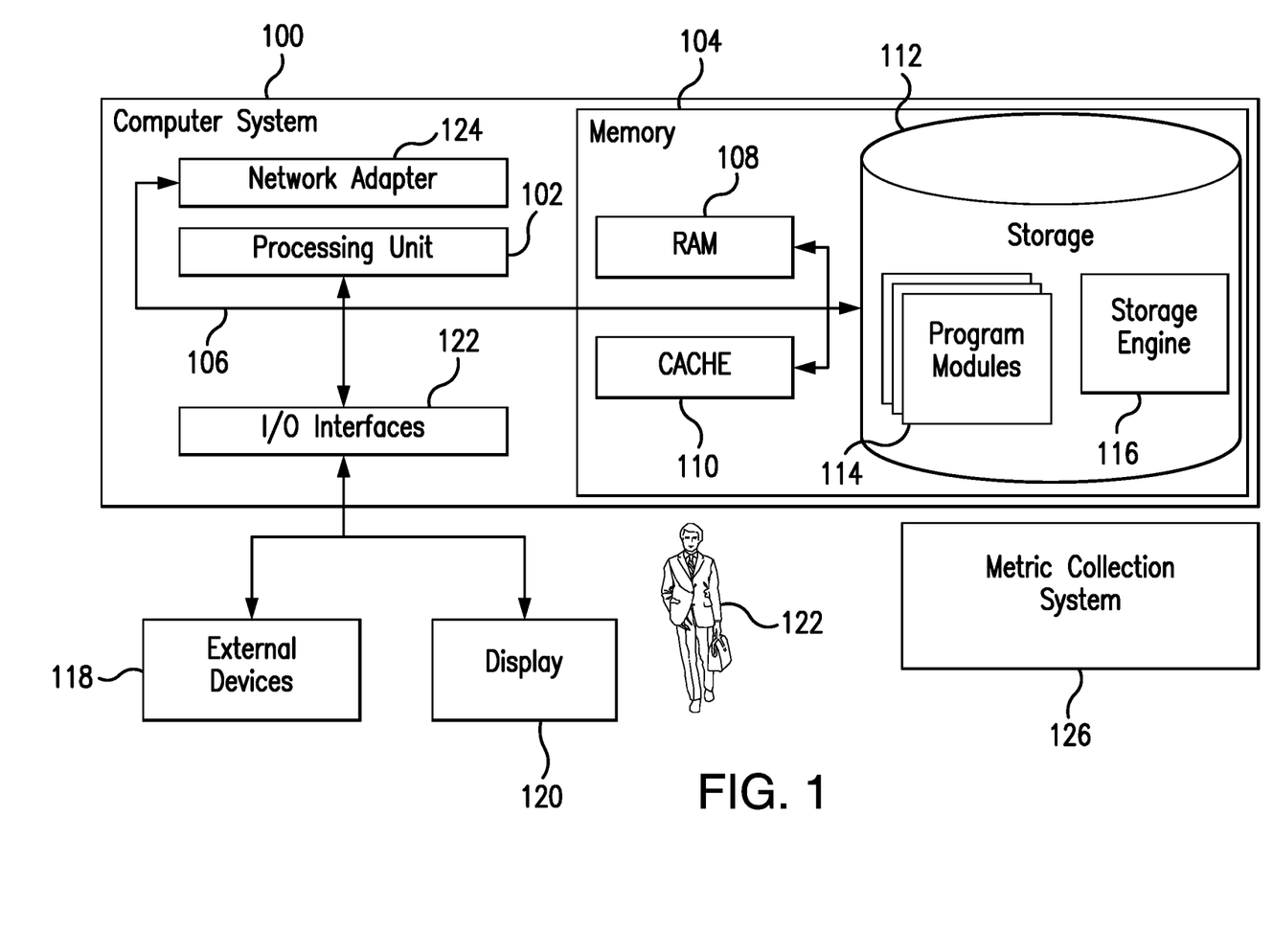
FIG. 1 is a deployment diagram of an embodiment of a system in accordance with embodiments of the present invention.

Referring to FIG. 1, there is shown a deployment diagram of the preferred embodiment within a computer system 100. Computer system 100 is operational with numerous other general purpose or special purpose computing system environments or configurations. Examples of computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer system 100 is shown in the form of a general-purpose computing device. The components of computer system 100 may include, but are not limited to, one or more processors or processing units 102, a system memory 104, and a bus 106 that couples various system components including system memory 104 to processor 102.

Bus 106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 100 typically includes a variety of computer system readable media. Such media may be any available media that is accessible by computer system 100, and it includes both volatile and non-volatile media, removable and non-removable media.

System memory 104 comprises readable volatile memory such as random access memory (RAM) 108 and cache memory 110 and also non-volatile or persistent storage 112. Computer system 100 may further include other removable/non-removable, volatile/non-volatile computer system storage media. By way of example only, storage 112 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 106 by one or more data media interfaces. As will be further depicted and described below, memory 104 may include at least one program product having a set (for example, at least one) of program modules that are configured to carry out the functions of embodiments of the invention.

A set of program modules 114, may be stored in memory 104 by way of example, and not limitation, as well as an operating system, one or more application programs, other program modules, and program data. Each of the operating system, one or more application programs, other program modules, and program data or some combination thereof, may include an implementation of a networking environment. At least one program module 114 can be provided to carry out the functions and/or methodologies of embodiments of the invention as described herein. In the preferred embodiment, storage engine 116 is a computer program configured to carry out the functions of the embodiments of the invention.

Computer system 100 may also communicate with one or more external devices 118 such as a keyboard, a pointing device, a display 120, etc.; one or more devices that enable a user 122 to interact with computer system 100; and/or any devices (e.g., network card, modem, etc.) that enable computer system 100 to communicate with one or more other computing devices. Such communication can occur via I/O interfaces 122. Still yet, computer system 100 can communicate with one or more networks such as a local area network (LAN), a general wide area network (WAN), and/or a public network (e.g., the Internet) via network adapter 124. As depicted, network adapter 124 communicates with the other components of computer system 100 via bus 106. It should be understood that although not shown, other hardware and/or software components could be used in conjunction with computer system 100. Examples, include, but are not limited to: microcode, device drivers, redundant processing units, external disk drive arrays, RAID systems, tape drives, and data archival storage systems.

In a preferred embodiment of the present invention, metric collection system 126 comprises an external performance measurement collection engine. In another embodiment a metric collection system comprises an integrated performance measurement collection engine.

Figure 2:
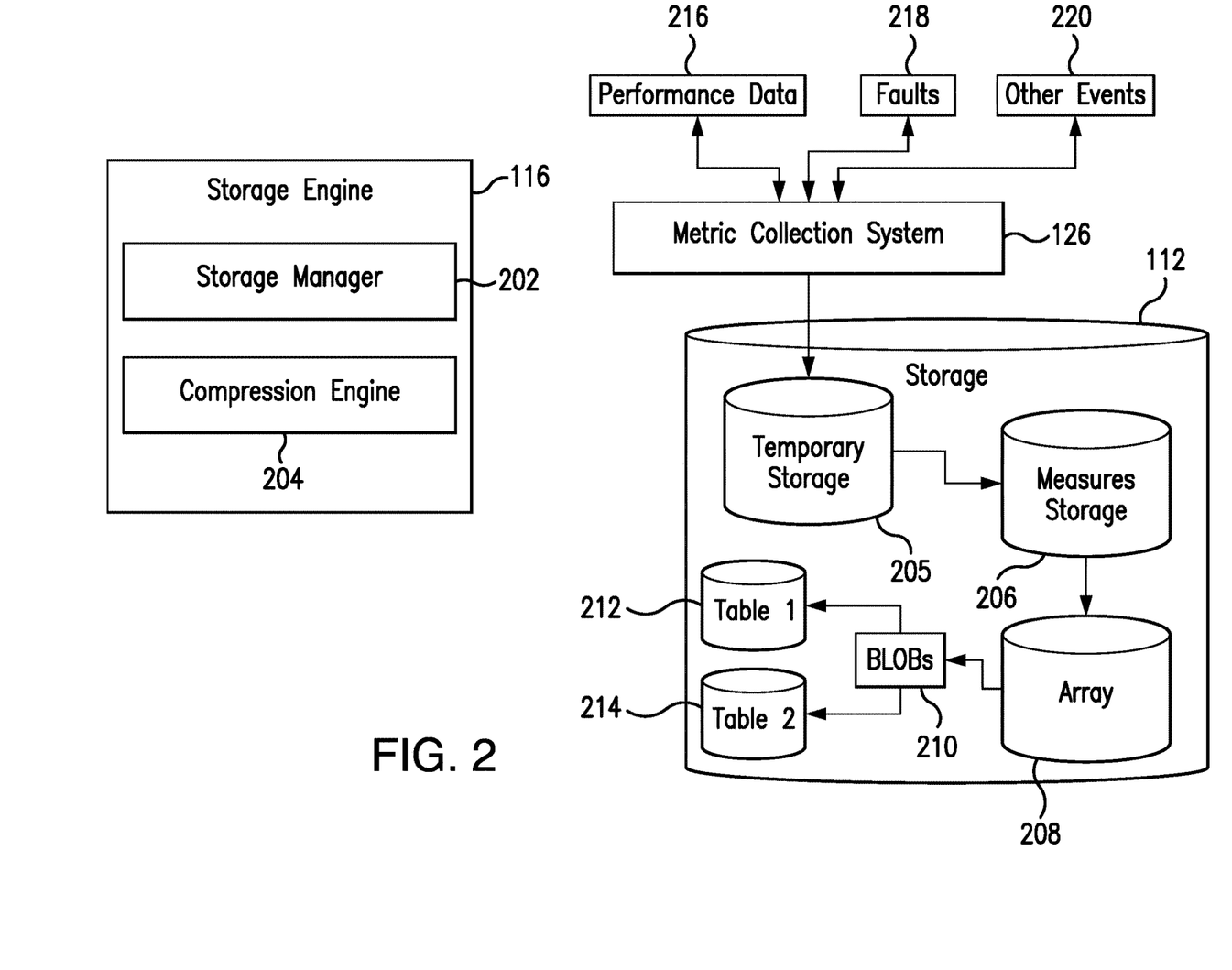
FIG. 2 is a component diagram in accordance with an embodiment of a system.

Referring to FIG. 2, the preferred embodiment is a storage engine 116 in the form of a computer program comprising: storage manager 202 and compression engine 204. Metric collection system 126 is shown collecting performance data 216, fault data 218 and other events 220 and feeding corresponding metrics into temporary storage 205 independently of the embodiment. For example, the metric collection system 126 may be set to collect performance data 216, fault data 218 and other events 220 only, once every minute. In various embodiments, metric collection system 126 may comprise any suitable network monitoring system, for example.

Storage 112 stores storage engine module 116 before execution. On execution, a copy of storage engine 116 is placed in cache memory 110 for execution and data structures used by the embodiments are created in the storage system 112. The data structures comprise: temporary storage 205, measures 206; array 208, first table 212 and second table 214. Storage manager 202 is responsible for creating and managing data structures created in storage system 112. Metric collection system 126 is configured to feed events directly to temporary storage 205.

Compression engine 204 is configured to compress and store the elements of the array 208 as a plurality of BLOBs 210, as discussed below.

Figure 3:
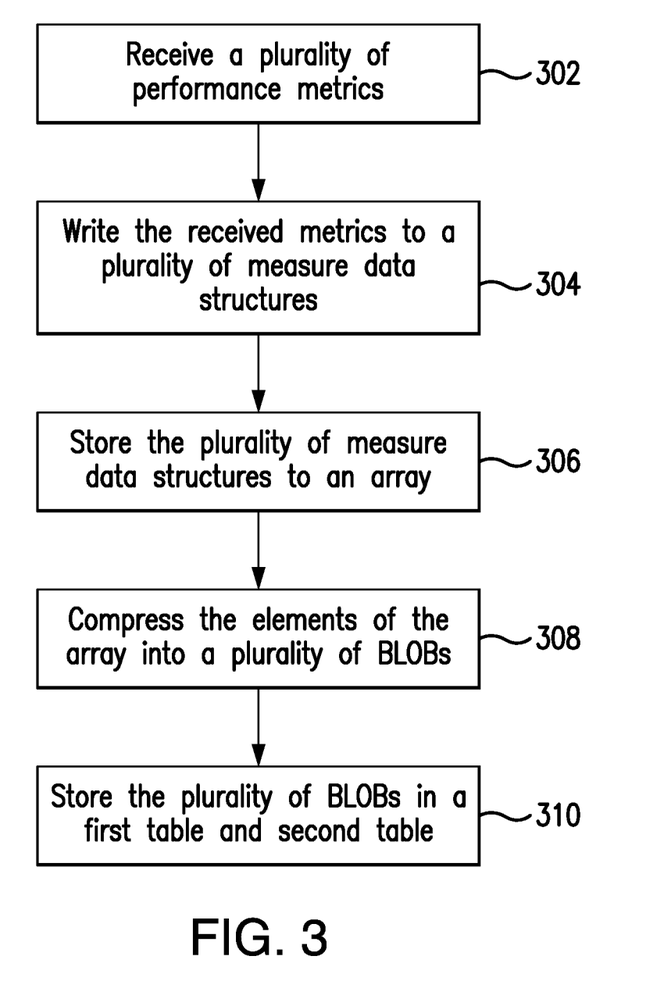
FIG. 3 is a flow diagram of a method for processing time series measurement data in accordance with an embodiment of the present disclosure.
Figure 4:
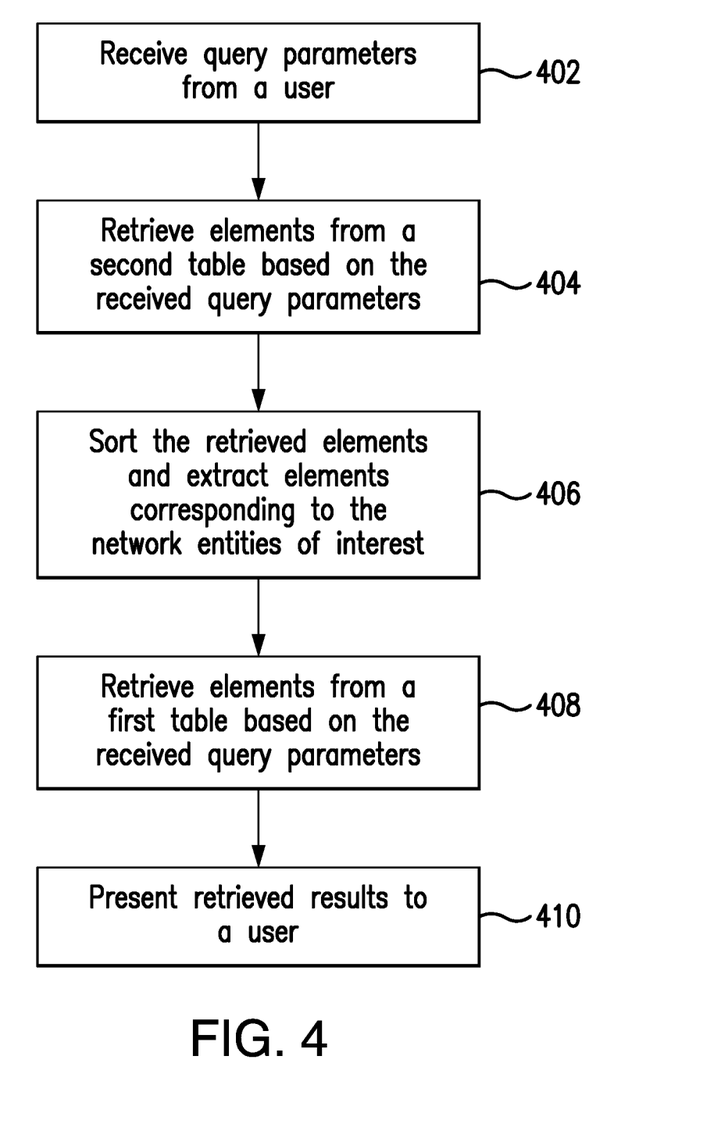
FIG. 4 is a flow diagram of a method for retrieving time series measurement data in accordance with an embodiment of the present disclosure.

FIGS. 3 and 4 are flowchart illustrating methods for processing time series measurement data and for retrieving time series measurement data, respectively, in accordance with disclosed exemplary embodiments of the present invention. Before turning to description of FIGS. 3 and 4, it is noted that the flow diagrams in these figure show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be performed. As will be appreciated by one skilled in the art, aspects of the present invention may be embodied as a method or computer program product. In some embodiments, the methods described below may be performed, at least in part, by one or more components of the storage engine 116, such as, but not limited to, the storage manager 202 and compression engine 204.

Starting with FIG. 3, at step 302, storage manager 202 receives time-series measurement data from the metric collection system 126. As discussed herein, "time-series measurement data" may include, among other things, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The data can be structured, unstructured, or semi-structured and can come from files, directories, network packets, network events, and/or sensors. Machine data generated by, for example, data sources within an enterprise network environment is generally considered to be unstructured data.

Time-series measurement data includes a plurality of network performance metrics having a timestamp and collected over a plurality of time periods. Each network performance metric measures the performance of a network entity. Each of the plurality of network performance metrics is associated with a unique integer identifier and a metric type identifier associated with the metric. Various types of aggregated metric values may include, but are not limited to, a count, a maximum, a minimum, an average, an arithmetic mean, a geometric mean, a median, a mode, or any other appropriate measure of central tendency of metric values associated with a timestamp. Other types of aggregated metric values may include bitmaps holding cardinality values, histograms, and the like.

In addition to plurality of the network performance metrics, the received time-series measurement data may include a plurality of events. An "event" may include a single record of activity from a particular data source associated with a single timestamp. Such an event may correspond to, for example, one or more lines in a log file or other data input. Further, "events" may be derived from processing or indexing machine data or may include other kinds of events. Events can also correspond to any time-series data, such as a sensor measurement, for example. Storage manager 202 preferably collects performance data, fault data and other events and feeds corresponding metrics into temporary storage 205.

According to an embodiment of the present invention, at 304, storage manager 202 is configured to process the data stored in temporary storage 205 and to write that data to a plurality of measure data structures 206. Each one of the plurality of measure data structures 206 is configured to store time-series measurement data (e.g., a list of performance metrics) corresponding to one network entity. In one embodiment, each one of the plurality of measure data structures 206 includes a header that indicates a type of stored metric values and a time period associated with the time series measurement data stored within a corresponding measure data structure. The header may further include information identifying corresponding network entity. In this embodiment, each of the plurality of measure data structures 206 can be stored into an array of unsigned long integers. This array stores the metric identifier, metric type and metric values. In some embodiments, there may be an additional table that maps metric identifiers to metric names. It should be noted that related metrics can be grouped together into one measure data structure 206 based on a metric type.

At step 306, storage manager 202 stores the plurality of measure data structures to a data structure configured as a two dimensional array 208 having a first dimension and a second dimension. The first dimension represents time and the second dimension represents a plurality of network entities. For example, in one embodiment, such two dimensional array 208 may store data accumulated for one hour, where the first dimension represents sixty minutes and the second dimension represents, for example, two hundred fifty thousand network entities in a monitored network.

According to embodiments of the present invention, at step 308, compression engine 204 divides and compresses the elements of the two-dimensional array 208 into a plurality of BLOBs 210. In one example, each of the plurality of BLOBs 210 is associated with a time period and a measure type associated with the time-series measurement data stored within the corresponding BLOB. According to an embodiment of the present invention, compression engine module 204 groups the same metrics together so that the compression technique employed by compression engine 204 can work on similar values pertaining to performance of the corresponding operations of a particular network entity.

At step 310, storage manager 202 indexes and stores the plurality of BLOBs compressed by compression engine 204 in two different tables—first table 212 and second table 214. In an embodiment, first table 212 comprises a table that indexes the plurality of BLOBs via a combination of a network entity and a time period. In other words, in the first table 212 each BLOB contains all the metric values collected over a period of 60 minutes for a particular network entity being monitored. First table 212 may be referred to as 'chart' table. In an embodiment, second table 214 comprises a table that indexes the plurality of BLOBs by combining a network performance metric and a network entity. In other words, in the second table 214 each BLOB holds the values of a particular performance metric for all of the network entities for a particular time period.

Referring now to FIG. 4, there is shown a flow diagram of a method for retrieving time series measurement data in accordance with an embodiment of the present disclosure. At step 402, storage manager 202 receives from a user query parameters for a query to be executed against data stored in the storage 112. In one embodiment, the time series data-storage and retrieval system, such as computer system 100 shown in FIG. 1, may further comprise graphical-user interface (GUI) tools (not shown in FIG. 2) which could be utilized by users to enter query parameters. As a non-limiting example, users' query may specify performance metrics of interest (such as a, b, c, d, x), identify sorting metric (e.g., x), specify both the time period (e.g., time period 7) and network entities (such as y to z) for which performance metric values should be retrieved.

At step 404, storage manager 202 issues a query for retrieving BLOB elements from second table 214 based on the received query parameters. In other words, store manager 202 searches second table 214 for one or more BLOBs containing the performance metric of interest (in this case sorting metric x) and time period of interest associations. Continuing with the example above, such performance metric-time period association comprises x/T associations.

At step 406, store manager 202 sorts the returned results for the issued query. In addition, at step 406, store manager 202 identifies and extracts eligible performance metric values corresponding to the network entities of interest (y to z). Next, at step 408, storage manager 202 issues a query for retrieving BLOB elements from first table 212 based on the received query parameters and based on the results of step 406. In other words, store manager 202 searches first table 212 for one or more BLOBs containing the time period of interest and network entities of interest associations. Continuing with the example above, such associations comprise all associations between time period T and network entities y to z. According to an embodiment of the present invention, at step 410, search results obtained in steps 404 and 408 are presented to a user via a GUI, for example.

Figure 5:
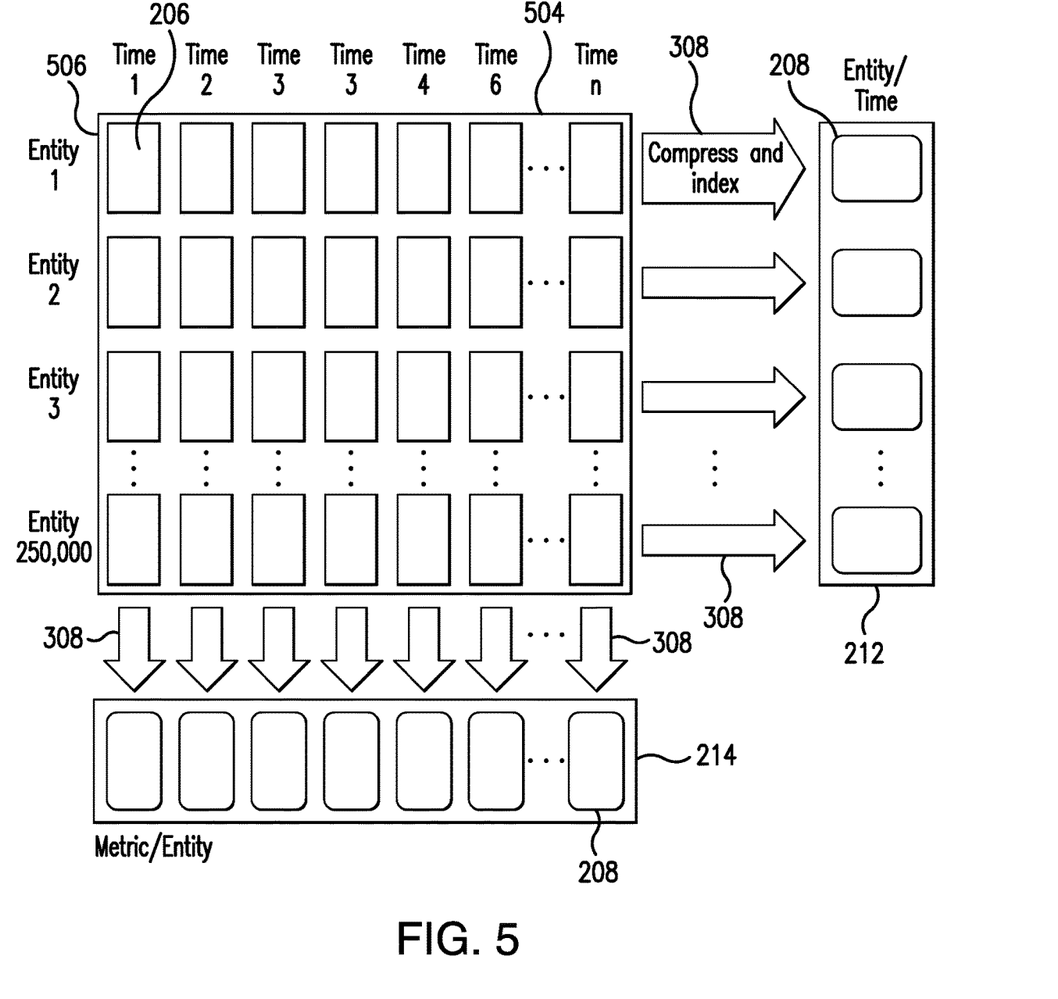
FIG. 5 graphically illustrates a sequence of steps performed for storing time series measurement data, in accordance with various embodiments of the present disclosure.

FIG. 5 graphically illustrates a sequence of steps performed for storing time series measurement data, in accordance with various embodiments of the present disclosure. As shown in FIG. 5, two-dimensional array 208 includes a first axis 504 (representing a first dimension) and a second axis 506 (representing a second dimension). In other words, first axis 504 represents time, while second axis 506 represents a number of network elements for which performance data is being stored and retrieved. Two-dimensional array 208 may also be described as having m number of rows of the measure data structures 206 in which each measure 206 includes approximately 40 performance metrics and in which m represents the number of network entities being monitored. Alternatively, two-dimensional array 208 may also be described as having n number of columns of the measure data structures 206 in which n represents a particular time period (e.g., one minute). In some embodiments, each measure may include more or less network performance metrics.

FIG. 5 also shows step 308 performed by compression engine 204 which combines, compresses and indexes particular groups of measure data structures 206. This compression function performed by compression engine 204 is used by storage manager 202 to distribute compressed data among first table 212 and second table 214. As noted above, first table 212 stores a plurality of BLOBs 208 which are indexed by a combination of a network entity and a time period and second table 214 stores a plurality of BLOBs 208 which are indexed by a combination of a network performance metric and a network entity. In other words, each BLOB stored in first table 212 represents one raw (e.g., one hour) of measure data structures 206 corresponding to a particular network entity being monitored. In addition, each BLOB 208 stored in second table 214 represents one column of measure data structures 206 corresponding to a particular time period.

In view of the above, embodiments of the present invention provide an indexed storage and retrieval system, in which unique and novel combination of packaging, compressing and storing time series measurement data in two different tables (i.e., by time and by performance metric) allows to shorten a content retrieval time from the storage system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing time series measurement data, the method comprising:

receiving time series measurement data comprising a plurality of network performance metrics over a plurality of time periods for a plurality of network entities, wherein each network performance metric measures performance of a network entity of the plurality of network entities;

writing the received time series measurement data for the plurality of network entities to a plurality of measure data structures comprising the plurality of network performance metrics, each one of the plurality of measure data structures stores time series measurement data corresponding to a respective network entity for a respective one of the time periods, each one of the plurality of measure data structures includes a header indicating a type of stored metric values and the time period associated with the time series measurement data stored within a corresponding measure data structure;

storing the plurality of measure data structures to a data structure configured as a two dimensional array having a first dimension and a second dimension, wherein the first dimension represents time and the second dimension represents a plurality of network entities, each element of the two dimensional array comprising a respective measure data structure;

compressing the elements of the two-dimensional array into a first plurality of Binary Large Objects (BLOBs) and a second plurality of BLOBs;

storing the first plurality of BLOBS in a first table, wherein the first table is indexed by a combination of a network entity and a time period and wherein each of the first plurality of BLOBs contains all the metric values collected over a time period for a particular network of the plurality of network entities being monitored; and storing the second plurality of BLOBs in a second table, wherein the second table is indexed by a combination of a network performance metric and a network entity and wherein each of the second plurality of BLOBs holds the values of a particular performance metric for all of the entities of the plurality of network entities for a particular time period.

2. The method of claim 1, wherein each of the plurality of network performance metrics is associated with a unique integer identifier and is associated with a metric type identifier.

3. The method of claim 2, wherein the metric type identifier identifies at least one of: maximum, minimum, average, bitmap, and histogram types of performance metrics.

4. The method of claim 1, wherein each of the plurality of measure data structures is stored in an array of unsigned long integers.

5. The method of claim 1, wherein the first dimension of the two dimensional array represents a predefined number of minutes and the second dimension of the two dimensional array represents a predefined number of network entities.

6. A system for storing and retrieving time series measurement data, the system comprising:

a metric collection engine for acquiring a plurality of network performance metrics and events related to performance of a plurality of network entities in a monitored network;

a storage repository comprising a first table and a second table for storing the plurality of network performance metrics; and an information processing system comprising a processor and a memory device coupled to the processor in communication with the metric collection engine and with the storage repository, the memory device containing a set of instructions that, when executed by the processor, cause the processor to:

receive, from the metric collection engine, time series measurement data comprising the plurality of network performance metrics for the plurality of network entities over a plurality of time periods, wherein each network performance metric measures performance of a network entity of the plurality of network entities;

write the received time series measurement data for the plurality of network entities to a plurality of measure data structures comprising the plurality of network performance metrics, each one of the plurality of measure data structures stores time series measurement data corresponding to a respective network entity for a respective one of the time periods, each one of the plurality of measure data structures includes a header indicating a type of stored metric values and the time period associated with the time series measurement data stored within a corresponding measure data structure;

store the plurality of measure data structures to a data structure configured as a two dimensional array having a first dimension and a second dimension, wherein the first dimension represents time and the second dimension represents a plurality of network entities, each element of the two dimensional array comprising a respective measure data structure;

compress the elements of the two-dimensional array into a first plurality of Binary Large Objects (BLOBs) and a second plurality of BLOBs;

store the first plurality of BLOBS in the first table, wherein the first table is indexed by a combination of a network entity and a time period and wherein each of the first plurality of BLOBs contains all the metric values collected over a time period for a particular network of the plurality of network entities being monitored; and store the second plurality of BLOBs in a second table, wherein the second table is indexed by a combination of a network performance metric and a network entity and wherein each of the second plurality of BLOBs holds the values of a particular performance metric for all of the entities of the plurality of network entities for a particular time period.

7. The system of claim 6, wherein each of the plurality of network performance metrics is associated with a unique integer identifier and is associated with a metric type identifier.

8. The system of claim 7, wherein the metric type identifier identifies at least one of: maximum, minimum, average, bitmap, and histogram types of performance metrics.

9. The system of claim 6, wherein each of the plurality of measure data structures is stored in an array of unsigned long integers.

10. The system of claim 6, wherein the first dimension of the two dimensional array represents a predefined number of minutes and the second dimension of the two dimensional array represents a predefined number of network entities.

11. The system of claim 6, wherein the set of instructions that, when executed by the processor, further cause the processor to:
- receive, from a user, one or more query parameters, the query parameters comprising at least network performance metrics of interest, a time period of interest and network entities of interest;
- retrieve elements from the second table based on the received query parameters;
- sort the retrieved elements and extract one or more elements corresponding to the network entities of interest; and
- retrieve elements from the first table based on the received query parameters.

12. The system of claim 6 further comprising a graphical user interface (GUI), wherein the user provides the one or more query parameters using the GUI.

13. The system of claim 6, wherein the two dimensional array stores data accumulated for one hour.

* * * * *